(12) United States Patent
Johnsen

(10) Patent No.: US 6,463,692 B1
(45) Date of Patent: Oct. 15, 2002

(54) ANGLING DEVICE

(76) Inventor: Jørgen Johnsen, 18 Bernhard Olsens Vej, DK-2830 Virum (DK)

( * ) Notice: Subject to any disclaimer, the term of this patent is extended or adjusted under 35 U.S.C. 154(b) by 0 days.

(21) Appl. No.: 09/576,231

(22) Filed: May 22, 2000

(51) Int. Cl.[7] .............................................. A01K 97/00
(52) U.S. Cl. ...................................................... 43/17.2
(58) Field of Search ........................................ 43/17.2

(56) References Cited

U.S. PATENT DOCUMENTS

| | | | | |
|---|---|---|---|---|
| 2,479,448 A | * | 8/1949 | Woock | 43/17.2 |
| 2,493,100 A | * | 1/1950 | Adams | 43/17.2 |
| 2,760,810 A | * | 8/1956 | Smith | 43/17.2 |
| 2,807,906 A | * | 10/1957 | Mun | 43/17.2 |
| 2,915,845 A | * | 12/1959 | Hughes | 43/17.2 |
| 3,550,303 A | * | 12/1970 | Western | 43/17.2 |
| 3,643,366 A | * | 2/1972 | Gates | 43/17.2 |
| 3,783,546 A | * | 1/1974 | Meyers | 43/17.2 |
| 4,043,072 A | * | 8/1977 | Condurso | 43/17.2 |
| 4,057,925 A | * | 11/1977 | Wong | 43/17.2 |
| 4,408,411 A | * | 10/1983 | Skarnells | 43/17.2 |
| 4,598,493 A | * | 7/1986 | O'Brien | 43/17.2 |
| 4,885,863 A | * | 12/1989 | Sprague | 43/17.2 |
| 5,615,511 A | * | 4/1997 | Crane | 43/17.2 |
| 5,864,979 A | * | 2/1999 | Iannuccilli | 43/17.2 |

* cited by examiner

*Primary Examiner*—Kurt Rowan
(74) *Attorney, Agent, or Firm*—Browdy and Neimark, P.L.L.C.

(57) ABSTRACT

An angling device for recovering a lure and any fish hooked thereon said lure being connected to a first fishing line by coupling means whereby an extra line is connected to the coupling means, said device comprising: a tubular body with a central axis having an axial direction and with a first end and a second end in the axial direction, said body having an opening allowing said first fishing line to enter into a hollow center of the body, a fastening means for fastening said second line to the tubular body being provided adjacent to the first end, said first end being further provided with a catch for the coupling means.

7 Claims, 2 Drawing Sheets

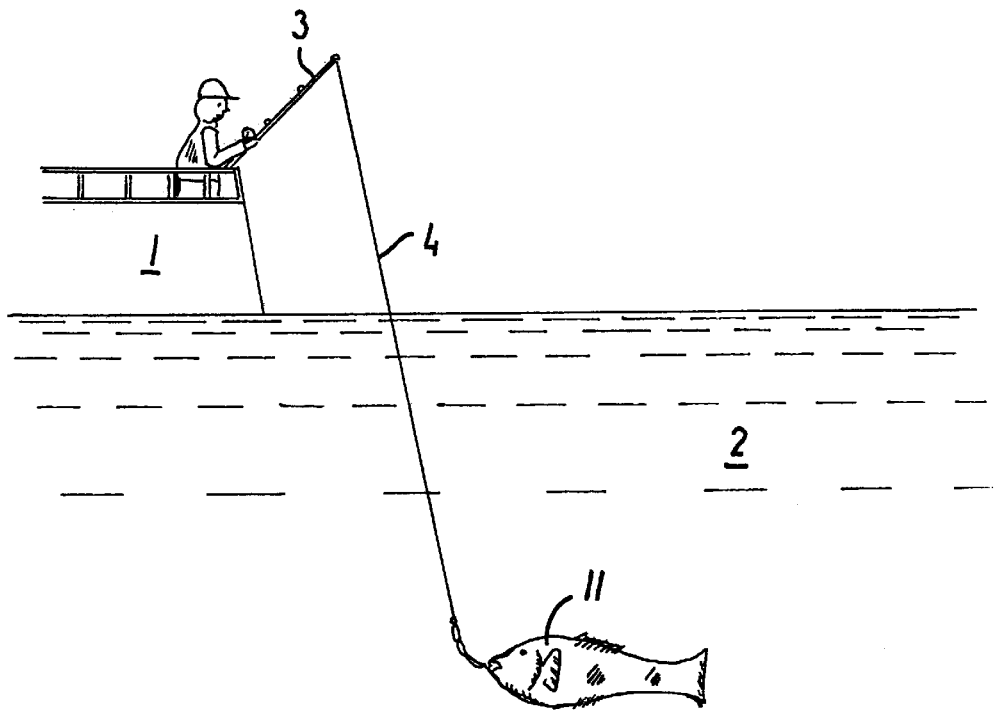
FIG.1
(PRIOR ART)
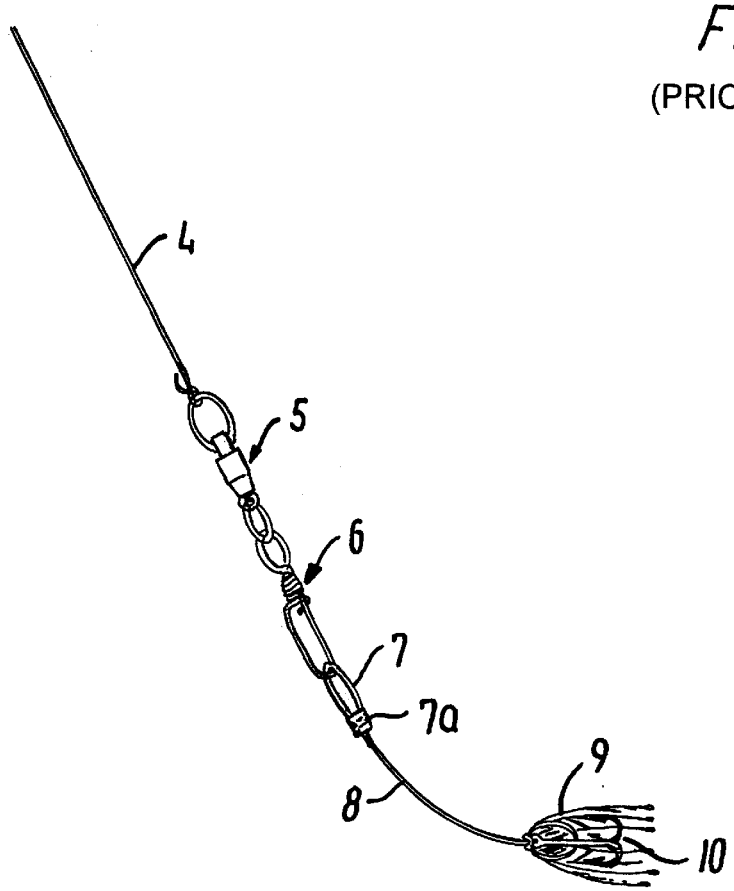
(PRIOR ART) FIG.2

ANGLING DEVICE

BACKGROUND OF THE INVENTION

The present invention relates to an angling device for recovering a lure and any fish hooked thereon said lure being connected to a first fishing line by coupling means whereby an extra line is connected to the coupling means.

When angling e.g. marlin by dragging a fishing line with a lure attached to a leader after a motor boat sailing at a speed of 10–15 knots it is sometimes experienced that a fish when hooked during its struggle goes deep down in the water, maybe more than 200 meters, where it actually dies from exhaustion and the big pressure. The dead fish can then be very heavy to pull up from the deep, sometimes too heavy for the fishing line which may thereby break.

Though an example is given of marlin angling it should be understood that other ways of angling and other kinds of fish may pose the same problem that the fish is too heavy or it is struggling too hard to be pulled up with the line in use.

BRIEF SUMMARY OF THE INVENTION

In a situation as the one outlined above it is desirable to be able to connect a second line or even more lines to the leader in order to be able safely to pull up the lure and the fish both of which may be quite valuable.

It is thus a purpose of the invention to provide a device that will make it possible to attach one or more additional lines to a submerged lure or its coupling means.

This is under a first aspect achieved in accordance with the invention by a device comprising a first ring-shaped body part with a hollow center and a central axis having an axial direction and with a first end and a second end in the axial direction, said first body part having an opening allowing said first fishing line to enter into the center of the first body part, a fastening means being provided for fastening said second line to the first body part, said first end being provided with a catch for the coupling means, a second ring-shaped body part coaxial with the first ring-shaped body part, said second body part having an opening allowing said first fishing line to enter into a hollow center of the second body part, and an interconnection between the first and the second body parts.

It is under a second aspect achieved by a device comprising a tubular body with a central axis having an axial direction and with a first end and a second end in the axial direction, said body having an opening allowing said first fishing line to enter into a hollow center of the body, a fastening means for fastening said second line to the first body part being provided adjacent to the first end, said first end being further provided with a catch for the coupling means.

BRIEF DESCRIPTION OF THE SEVERAL VIEWS OF THE DRAWING

An example of the invention will now be explained below by way of illustration only with reference to the schematical drawings, in which FIG. 1 illustrates angling;

FIG. 2 shows a fishing line with a lure;

DETAILED DESCRIPTION OF THE INVENTION

Figures 3, 4:
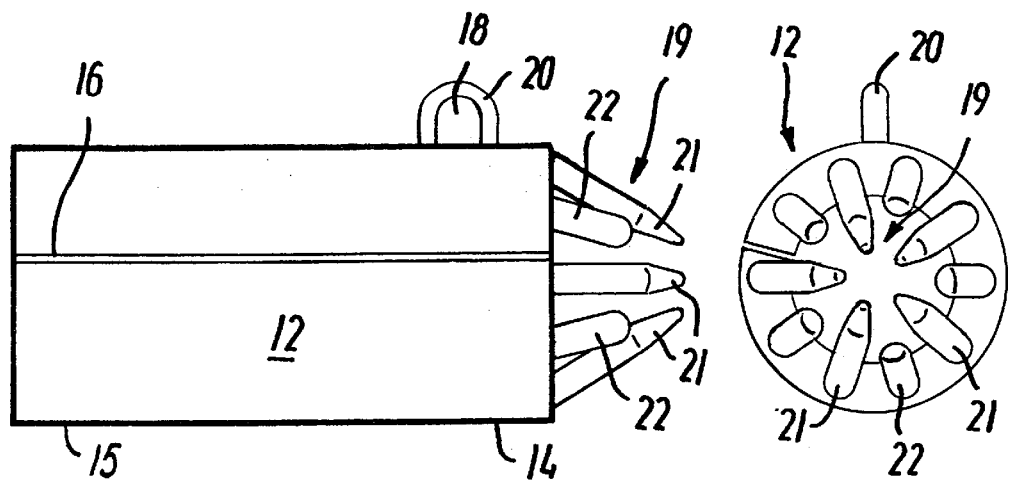
FIG. 3 shows an elevation of a part of a device according to the invention.
FIG. 4 shows an end view of the part shown in FIG. 3.
Figure 5:
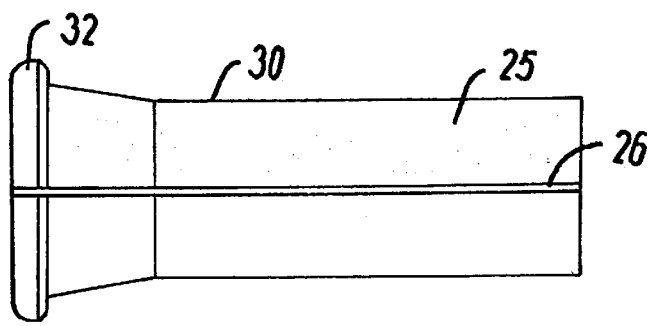
FIG. 5 shows a sleeve according to the invention.

FIG. 1 shows a boat 1 on the water 2 a fishing rod 3 extending from the aft of the boat and a fishing line 4 depending from the rod 3. A swivel 5 with a connector 6 of the so-called safety-pin type (FIG. 2) is tight to the fishing line 4 and the connector 6 is hooked into a ferrule-secured eye 7 terminating a string or leader 8 which is attached to an artificial lure 9 with a hook 10. Thus the swivel 5, the connector 6, the eye 7 with the ferrule 7a and the leader 8 provides a coupling means between the fishing line 4 and the lure 9.

In FIG. 1 a fish 11 is on the hook. As explained above it may occasionally not be possible to pull up the fish without risking that the fishing line 4 breaks.

The fish could be a marlin, a tuna, a halibut or another large fish. However e.g a large cod could also pose the problem if it is larger than foreseen when the thickness of the line was chosen.

The leader 8 is thick and strong compared to the fishing line 4 and thus according to the present invention a device is provided that may be submerged along the fishing line 4 to be connected with the swivel 5, the connector 6, the eye 7 of the leader 8 or the ferrule 7a in order to attach thereto one or more additional lines.

The device which is shown in FIGS. 3–6 comprises a tubular body or thick walled tube 12 with a central axis 13 having an axial direction, a first ring-shaped body part 14 and a second ring-shaped body part 15 in a first and second end of the tube 12 respectively, seen in the axial direction. The tube 12 has an opening which in the shown embodiment is a longitudinal slit 16 extending axially and radially and allowing a fishing line to enter into the hollow center 17 of the tube 12.

A fastening means in the form of an eye 18 for fastening an additional line to the tube 12 is provided adjacent to the first end. The first end is further provided with a catch 19 for the coupling means.

The eye 18 is made by a bend element 20 who's ends are inserted in bores in the wall of the tube 12 and fastened by gluing, soldering, welding, riveting or any other suitable manner. Instead of the bend element 20 an eyelet or a lug could be fastened to the wall of the tube 12 or a bore could be made through to wall of the tube 12 for a line to be pulled therethrough and tied on. Any other known means for fastening a line could likewise be provided.

The important issue is that the line should be securely fastened to the tube 12 and a pulling force from the line should act asymmetrically on the tube 12 adjacent to the first end i.e. on the first ring-shaped body part 14.

The catch 19 comprises a plurality of fingers 21, 22 extending from the first end of the tube. The fingers 21, 22 are inclined towards the central axis 13 and they are provided in two lengths, alternating a long finger 21 and a short finger 22. Hereby is obtained a minimum distance between adjacent fingers 21, 22 allowing the leader 8 or narrow parts of the swivel 5 and connector 6 to pass and a maximum distance between adjacent fingers that will not allow broader parts of the swivel 5, the connectors 6 and the ferrule-secured eye 7 to pass. The fingers 21, 22 are preferably connected rigidly to the first end of the tube 12 and in that case the points of the long fingers 21 has a mutual distance that allows the entire coupling means 5–7, 7a to pass.

The fingers may however be pivoted to pivot in radial planes between stops and they will in that case preferably be biased towards the central axis 13. Such pivots may however become rusty and thereby not able to pivot.

The device further comprises a removable sleeve 25 to be fitting into the interior of the tube 12. Like the tube 12 this sleeve 25 has an opening which in the embodiment shown is a longitudinal slit 26 extending axially and radially and allowing a fishing line to enter into the hollow center 27 of the sleeve 25.

The tube 12 has an inner wall with a cylindrical part 28 at the first end and an outwardly diverging part 29 at the second end, and the sleeve has an outer wall 30 matching the inner wall of the tube 12.

Figure 6:
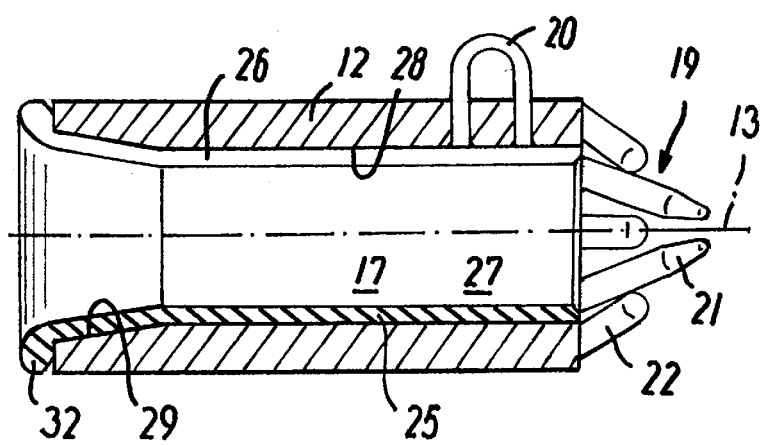
FIG. 6 shows a longitudinal section of a device according to the invention.
Figure 7:
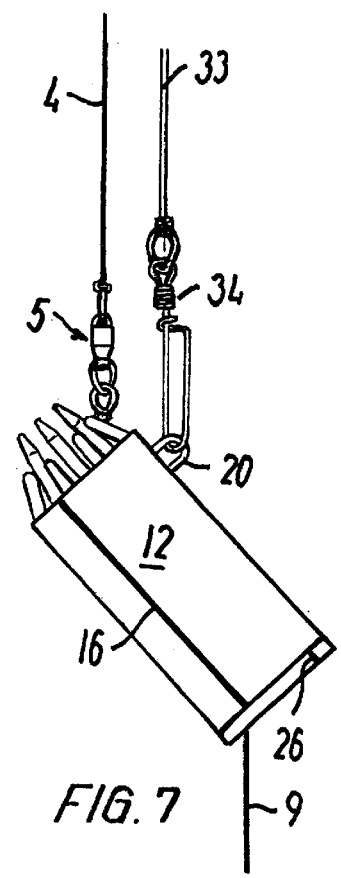
FIG. 7 shows the device in use.

The sleeve 25 comprises a collar 32 positioned outside the tube at the second end thereof. The collar 32 has a rounded cross-section as seen in FIG. 6.

The device is used in the following way:

When it is released that one or more additional line(s) 33 is/are necessary for pulling up a fish though the water the desired number of additional line(s) is/are fastened to the eye 18 of the tube 12 e.g. by means of a safety-pin type connector 34. If the sleeve 25 is inside the tube 12 it is pulled out by-grabbing the collar 32.

Then the tube is put onto the line 4 in that the latter is inserted through the slit 16 which has a sufficient size and a smooth surface in order not to scratch the line 4 which might otherwise cause the taut line to break. The tube 12 in put onto the line with its first end upwards pointing away from the end of the line 4 with the lure 9. Thereafter the sleeve 25 is put onto the line 4 in the same way as the tube 12 below the tube and the sleeve is then inserted into the tube making sure that the slits in the tube and the sleeve respectively are not aligned.

The device thus assembled is let go into the water down to the lure where it stops. The rounding of the collar ensures that the device is not caught by the coupling means 5–7, 7a and the coupling means also passes through the catch 19 with out being caught due to the slanted or inclined position of the fingers 21, 22. When the device is stopped by the lure or any fish that is hooked it stops pulling the additional line (a) which is registered on the boat by the fisherman. Then the additional line 33 is pulled in and the catch 19 catches the coupling means. Hereafter the lure and any fish may be pulled up by help of both line 4 and the additional line 33.

The catch 19 catches the coupling means 5–7, 7a in that the leader 8 or a narrow part of the coupling means 5–7 penetrates into a space between two fingers 21, 22 whereafter an adjacent thicker part of the coupling means 5–7, 7a is caught between those fingers 21, 22, or a finger 21, 22 may penetrate into an eye or a loop formed by the coupling means 5–7, 7a, e.g. the eye 7.

The tube 12, the fingers 21, 22 and the fastening element 20 are preferably made of stainless steel in order to avoid rust even though the device will be used in sea water. The fingers are preferably made by inserting straight pins into bores in the first end of the tube 12 and securing them by threading, gluing, soldering, riveting or any other known suitable means where after the secured pins are bent approximately 30° towards the central axis 13 of the tube 12.

The tube preferably has a length of 6–10 cm and a wall thickness sufficient to provide for sufficient strength and a weight of preferably 300–700 g so that while descending in the water the device will give a pull readily feelable in the additional line 33, so that the fisherman will know when the device has reached the lure.

The first body part 14 has the function of carrying the catch 19 and the fastening means 18 for the additional line(s) 33. The second body part 15 has the function of controlling the position of the device in relation to the fishing line 4.

The sleeve 25 is preferably made from a suitable plastic material which is sufficiently soft not to scratch the fishing line 4 and sufficiently resilient to provide a tension between the sleeve 25 and the tube 12 allowing the sleeve to be extracted by hand but keeping the sleeve in the tube during use. The sleeve 25 has a slight overdimension in relation to the inner diameter of the tube 12 and the slit 26 in the sleeve 25 will allow it to be compressed when inserted in the tune 12.

The fingers 21, 22 are e.g. 4 mm in diameter and are mutually spaced by 6 mm along the first end of the tube 12. The minimum distance between the fingers 21, 22 is e.g. 4 mm and the maximum distance is e.g. about 7 mm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An angling device for recovering a lure and any fish hooked thereon said lure being connected to a first fishing line by coupling means whereby a second line is connected to the coupling means, said device comprising:

a first ring shaped body part with a hollow center and a central axis having an axial direction and with a first end and a second end in the axial direction, said first ring shaped body part having an opening allowing said first fishing line to enter into the center of the first ring shaped body part, a fastening means being provided for fastening said second line to the first ring shaped body part, said first end being provided with a catch for the coupling means, a second ring shaped body part coaxial with the first ring shaped body part, said second ring shaped body part having an opening allowing said first fishing line to enter into a hollow center of the second ring shaped body part, an interconnection between the first and the second ring shaped body parts, and a removable sleeve of resilient material insertable with a tension fit into the interior of the ring shaped body parts, said sleeve having an opening allowing said first fishing line to enter into a hollow center of the sleeve.

2. An angling device according to claim 1, wherein the first and the second ring shaped body parts are integral.

3. An angling device according to claim 2, wherein the first and the second ring shaped body parts are parts of a tubular body, providing a first and a second end respectively of said tubular body, wherein the tubular body has an inner wall with a cylindrical part at the first end and an outwardly diverging part at the second end and wherein the sleeve has an outer wall matching the inner wall of the tubular body.

4. An angling device according to claim 3, wherein the openings in the first and the second ring shaped body parts are provided by a longitudinal slit in the tubular body.

5. An angling device according to claim 4, wherein the longitudinal slit extends axially and radially in the tubular body.

6. An angling device according to claim 3, wherein the sleeve comprise a collar positioned outside the tubular body at the second end thereof.

7. An angling device according to claim 6, wherein the collar has a rounded cross-section.

* * * * *